United States Patent Office.

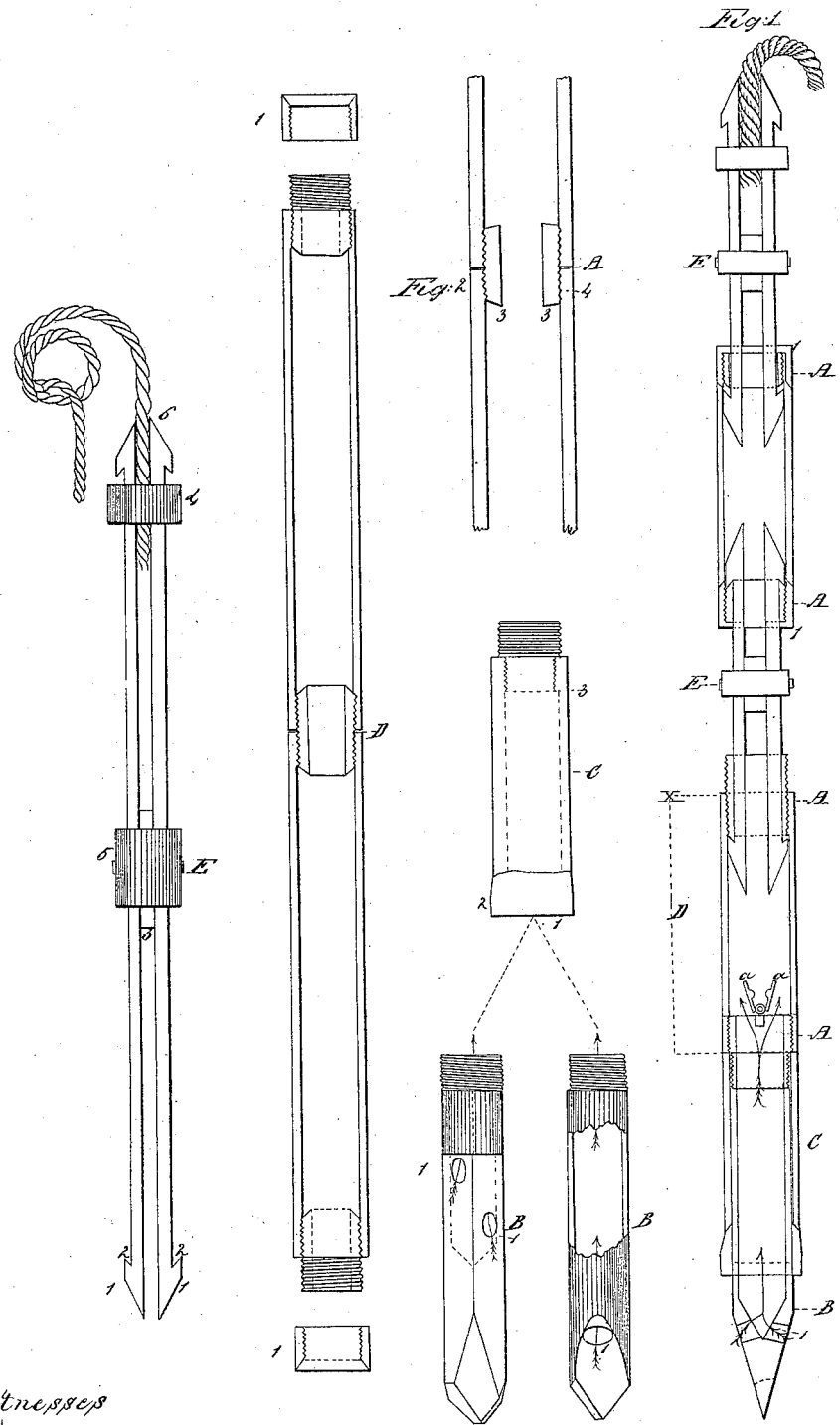

IMPROVEMENT IN DRILLS FOR WELLS.

PERLEY AINSWORTH, OF CAPE VINCENT, NEW YORK.

Letters Patent No. 59,740, dated November 20, 1866.

SPECIFICATION.

TO ALL WHOM IT MAY CONCERN:

Be it known, that I, PERLEY AINSWORTH, of Cape Vincent, in the county of Jefferson, in the State of New York, have invented a new and useful improvement in apparatus for drilling and boring earth and rock in the sinking artesian, petroleum, and other wells, and for other purposes, and I do hereby declare that the following is a full and exact description thereof, reference being had to the accompanying drawings and to the letters and figures of reference marked thereon.

My invention consists in making (instead of the centre bit, reamer, auger-stem, jars, sinker-bar, rope-socket, and sand pump, now in general use) the centre bit, reamer, auger-stem, jars, sinker-bar, rope-socket, sand pump, and grabs, in the following manner, thus allowing all these several parts to be used and worked together, and at the same time, or the centre bit, reamer, auger-stem, sinker-bar, and grabs, to be used separately. I construct the several parts of cylindrical tubes, the external diameter of which nearly equals the diameter of the well to be bored, and connect them in the following manner: I provide cylindric tubes of the proper thickness, the external diameter of which is equal to the internal diameter of the outside tubes, these I cut in sections of the proper length and make on the outside a screw thread from end to end, I then make a corresponding screw thread in the inside of the end of each outside joint of tubing, then I screw the short sections of tube one-half their length into the ends of the larger or outside joints of tubing, as shown at A in the accompanying drawings, making a firm, smooth screw joint of uniform size on outside, leaving a projecting shoulder, hollow on inside, useful and convenient to fasten to in working the apparatus; for greater security and strength when required, I braze the lower ends of the connecting tubes into the upper ends of the outside tubes, thereby combining the strength of the screw and the brazing to resist concussion in working the drill. This method of connecting the several parts is shown at A A A A in the accompanying drawings.

The reamer I construct of metallic tubing corresponding in diameter and thickness with the main tubing forming the auger-stem and connect it therewith in the manner above described, the lower end of the reamer being of steel tempered, and bevelled inwards at a proper angle to form a good cutting edge, as shown at $C^1$. I make the lower end of the reamer a little larger in diameter than the main tubing, and on the outside I cut spiral flutes or grooves with cutting edges on the upper sides of the grooves, so arranged that the clear water running down the outside can pass in under the edge of the reamer and fill the vacuum that may otherwise exist when the drill is raised in working; the reamer, thus constructed, making a perfectly round hole under all circumstances, shown at C in the drawings. The centre bit B, I construct of a metallic cylindric tube, the outer diameter of which equals the inner diameter of the reamer and auger-stem, the upper end of the bit or drill running up into the reamer to the inner shoulder formed by the connection of the reamer with the auger-stem, as shown in the accompanying drawings at $C^3$. The lower end of the centre bit or drill being solid, with cutting edge of steel, tempered and bevelled at acute angles in opposite directions from the centre to the edges, as shown at B B B so formed, the concussion of the centre bit or drill on the rock will give the drill a tendency to rotate, screwing each joint more firmly together, and delivering each succeeding blow at cross angles to the last, cutting the rock more easily and of course more rapidly. Through the scarfed sides of the drill point holes are made communicating with the interior hollow of the apparatus, as shown at B B B. The centre bit or drill may be made in other forms, preserving the principle of having holes or apertures made through the lower portion communicating with the interior hollow; a modification of the form is shown in the accompanying drawing $B^1$. On the top of the centre bit, or reamer so formed, I place a double valve, constructed of a metallic ring, having a bar or centre piece of sufficient width and thickness to bear the strain from above, this ring forming a valve seat and being between the shoulder of the inner tube forming the connection of the auger-stem and reamer or centre bit so situated as to be removable without inconvenience, the valve being a disk of leather, rubber, or other elastic material, strengthened on top by a metallic button, and held in place by a pin over the centre piece of the ring or any of the common devices for valves may be used in this connection.

For auger-stem I use a section of the main tubing of the proper thickness, length, and weight, connected with the other parts in the manner described, shown at D. On the top of the auger-stem I construct a cutting edge of steel of the same diameter as the auger-stem, as shown at $D^1$, this cutting edge will, when the apparatus is in use, clear the well from any obstruction that may have fallen in from above, by cutting its way upward in the same way as the reamer cuts downwards.

The placing the valve as herein above described causes the auger-stem to perform the functions of the ordinary sand pump.

Jars and grabs I construct by using two bars of iron or steel of proper length, and of such width and thickness as that three bars laid together will square the circle of the inner diameter of the inner tube forming the connection of the apparatus, on each end of these two bars I form a shoulder so shaped that when the bars are placed together back to back they appear shaped like an arrow with a head on each end, the shoulder projection at its base should correspond in thickness with the inside tubes forming the pin of the screw joints. I curve each bar slightly outward from the centre, and place a short piece of bar-iron or wood between the backs, securing them firmly together at the middle by driving on a band, ring, or short section of inner tubing, when thus substantially constructed I call them grab-jars. When thus made, the grab-jars can be used as jars by inserting one end in the upper end of the auger-stem, and the other end in the bottom of the sinker-bar, so used they are perfect jars. They may also be used as rope-socket and grabs by inserting one end in the top of the sinker-bar and sliding down a ring or band over the upper arrow-heads so they will spring apart, then placing between them the lower end of the rope or cable, and driving up the ring or band to the shoulder of the arrow heads, causing them to grasp firmly the cable or rope. And so used they do duty as rope-socket and grabs, when so attached to the rope by lowering them into the well they are certain to enter and seize firm hold of the shoulder of each or any of the screw joints of the apparatus E.

For sinker-bar, when desired, I use a section of the main tubing of the required weight and dimensions, corresponding with the auger-stem in diameter, both externally and internally, so that the sinker-bar may be used as auger-stem, or auger-stem in place of sinker-bar, or both together, forming one auger-stem or sinker-bar of double length and weight, and therefore having double power of concussion either up or down, as required; on the top and bottom of the sinker-bar I form a cutting edge similar to that on the top of the auger-stem.

This apparatus, constructed as above substantially set forth, possesses, among others, the following advantages over the apparatus and tools now in use for sinking wells:

It saves much time and labor, by permitting the three processes of drilling, reaming, and sand pumping to be carried on at the same time and at one operation.

The hole made by the centre bit being kept constantly free from the grit, debris, and dirt occasioned by cutting away rock and earth, enables the centre bit and reamer to do their work with much more rapidity.

In case the cable, by wear or other accident, parts below the surface, a bar may be sent down beside the cable, and the ring which confines the end of the cable within the arrow-headed rope-socket may be moved or driven downwards by the bar, and the rope thus detached within an hour, whereas by the old process weeks of labor are often spent in doing the same thing.

After the rope is detached from the rope socket and brought up, the auger-stem may be sent down attached to the cable, and passing over the arrow heads of the rope-socket, becomes securely attached to the tools in the well, and the tools may be got up in thirty minutes' time; an operation that by the common process consumes weeks, and sometimes months.

Should the tools part at any point in the well, the grabs constructed as set forth above may be sent down, and the apparatus, being hollow, the arrow heads pass immediately below the shoulders on the inside, and bring the tools up without any delay.

This apparatus, being smooth and round and filling the cavity of the well, and the reamer cutting a round hole, the tendency to cut a triangular or oval hole, and thus fasten the tools in the well, a tendency so hard to be overcome in the commonly used apparatus, is entirely obviated, and in shallow wells the outside tubing may be extended by screwing in sections of the same, and the debris, grit, and water pumped out above the surface of the ground by the action of drilling.

1. I claim the combining the centre bit, reamer, auger-stem, sand pump, grabs, jars, sinker-bar, and rope-socket, so that they may be worked and used efficiently separately or together, as above set forth.

2. I claim the plan or method of coupling as above described.

3. I claim the grab-jars, constructed as above described, separately and in combination with the apparatus, as above substantially set forth.

4. I claim the tube and reamers C, centre bit B, and valves $a\,a$, constructed so as to admit of their being used separately or in combination with the other apparatus, as a sand pump, pumping the debris or sediment into the main trunk as fast as made by the action of either the centre bit or reamer, or both, when worked together, as herein above substantially set forth.

5. I claim the round reamer, constructed as above described, separately and in combination with the apparatus as above substantially set forth, whether attached to the bottom or the top of the auger-stem or the sinker-bar, cutting either upward or downward.

6. I claim, in combination with the above described apparatus, the centre bit made hollow, as shown at B B, and bevelled at the edges substantially as and for the purpose set forth.

PERLEY AINSWORTH.

Witnesses:
L. H. AINSWORTH,
F. LECLERC.